April 29, 1941.   C. E. HATHAWAY   2,239,713
VALVE GEAR
Filed June 27, 1936   4 Sheets-Sheet 1
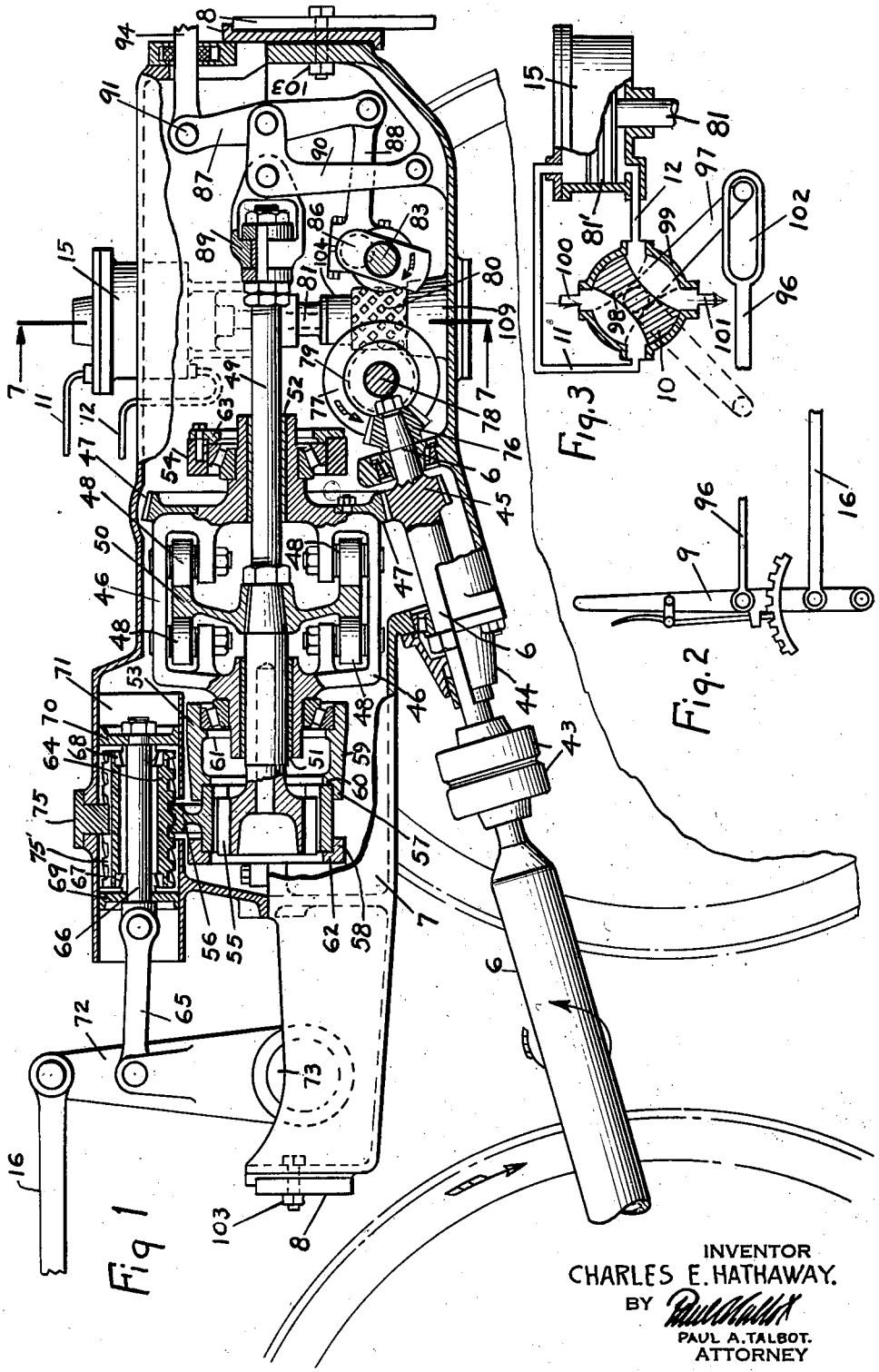
INVENTOR
CHARLES E. HATHAWAY.
BY
PAUL A. TALBOT.
ATTORNEY

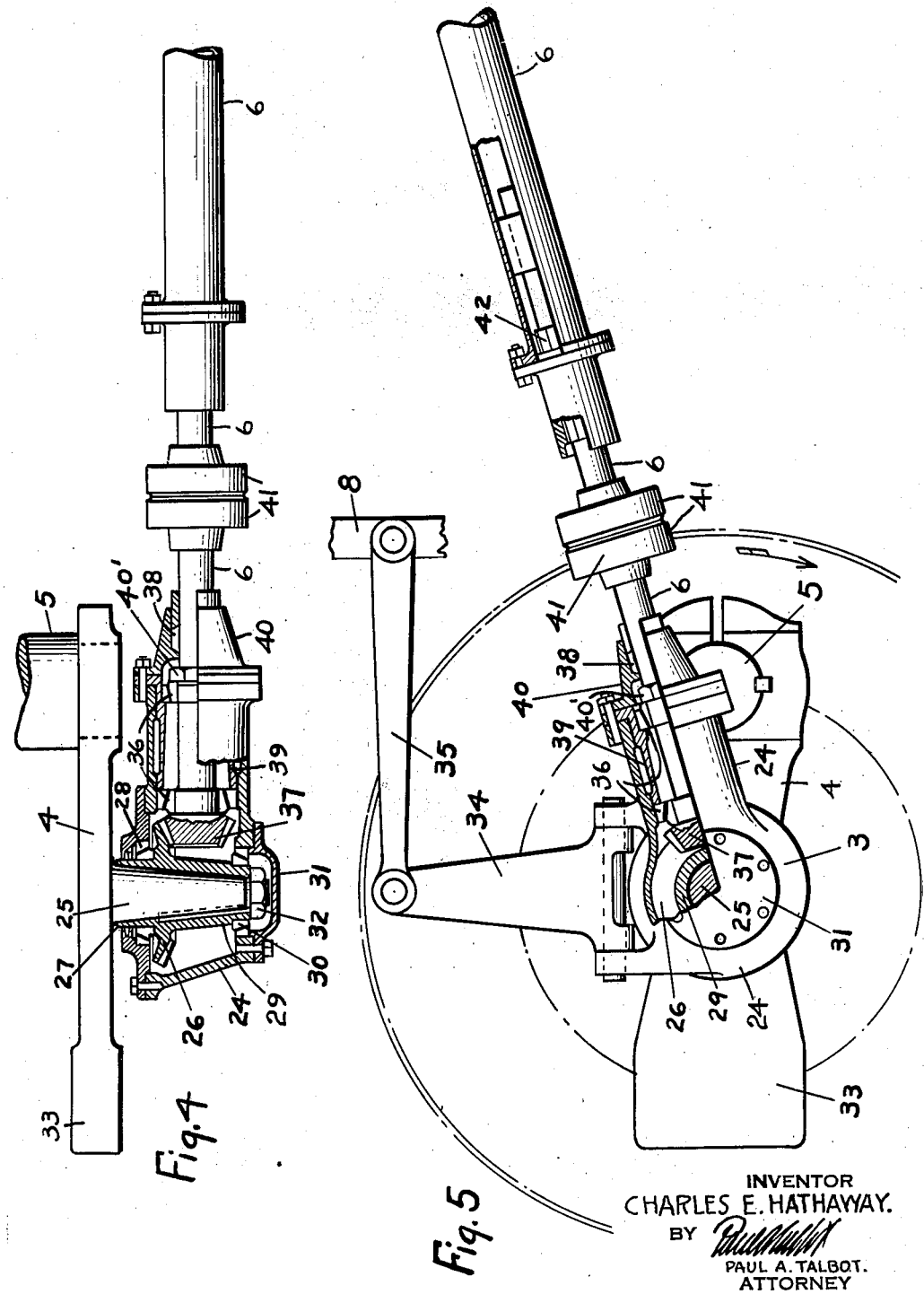

April 29, 1941.  C. E. HATHAWAY  2,239,713
VALVE GEAR
Filed June 27, 1936  4 Sheets-Sheet 3
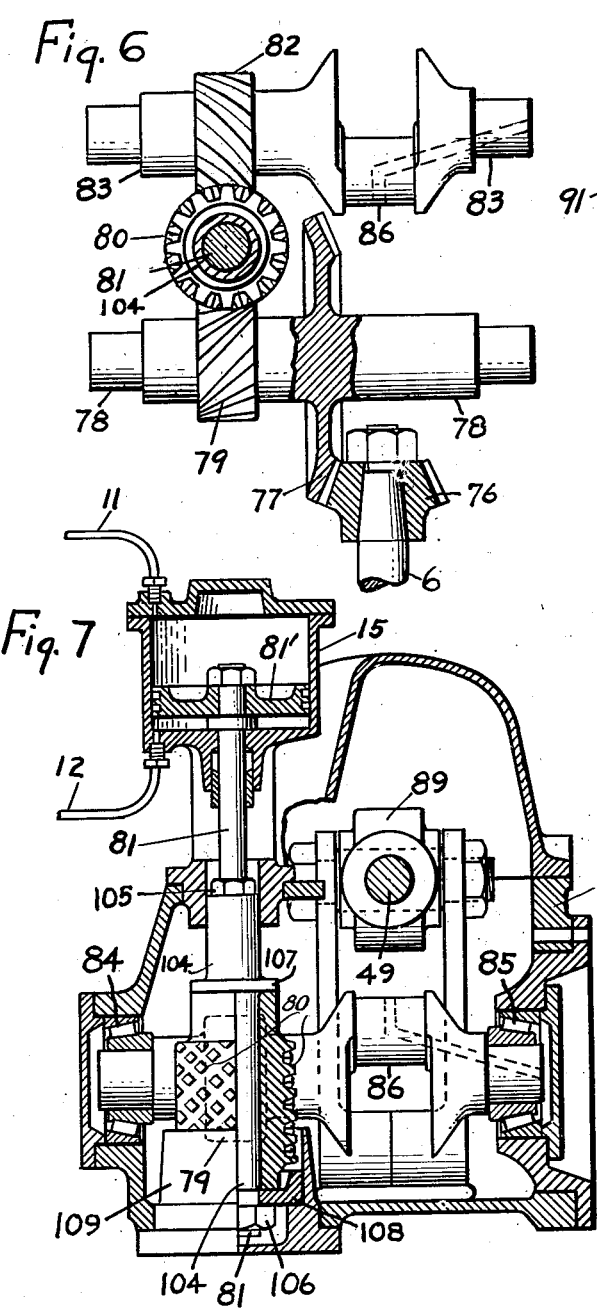
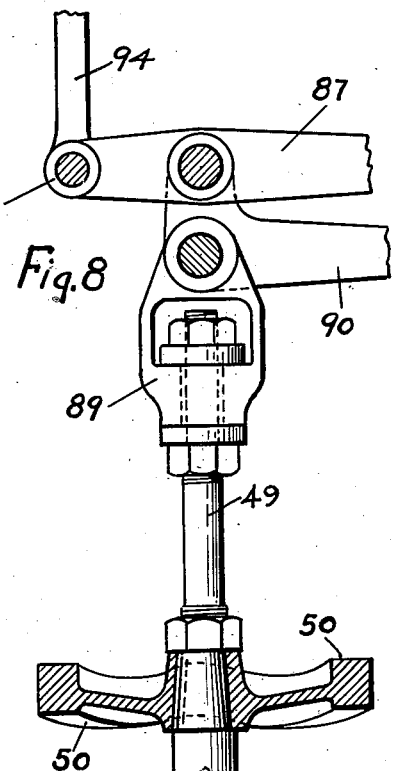
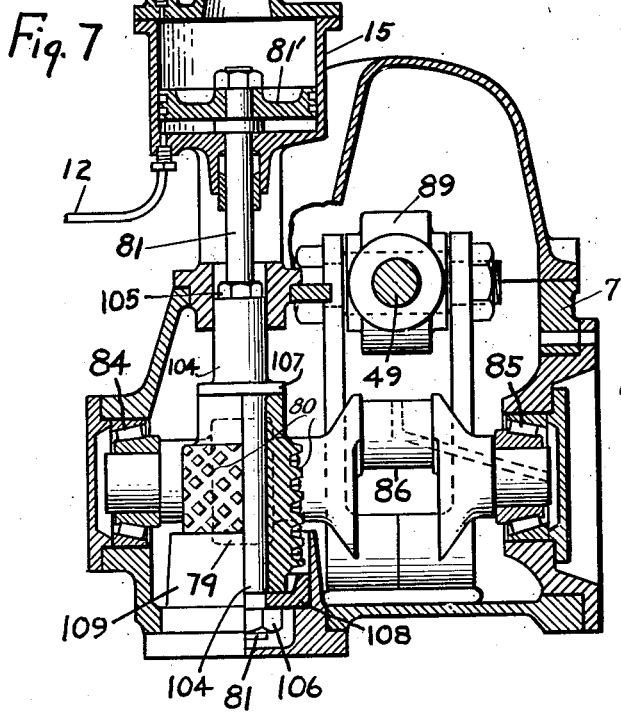
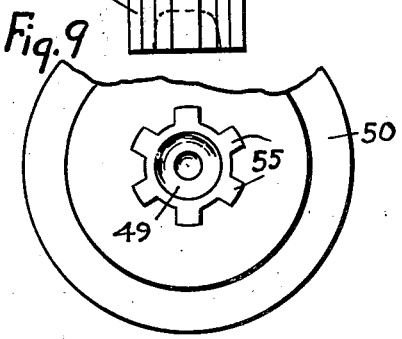
INVENTOR
CHARLES E. HATHAWAY.
BY
PAUL A. TALBOT.
ATTORNEY April 29, 1941.  C. E. HATHAWAY  2,239,713
VALVE GEAR
Filed June 27, 1936   4 Sheets-Sheet 4
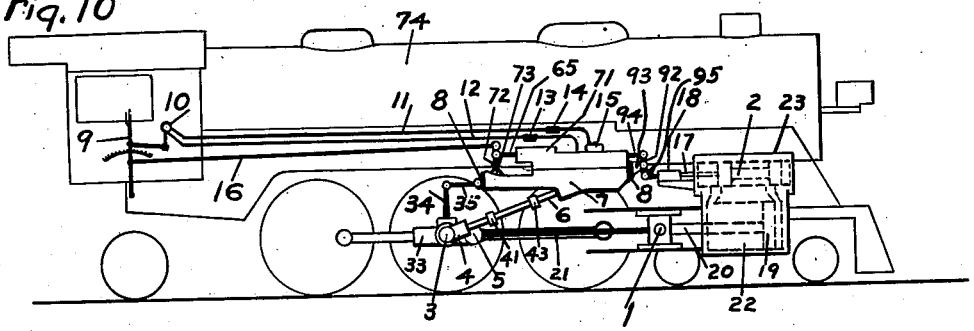
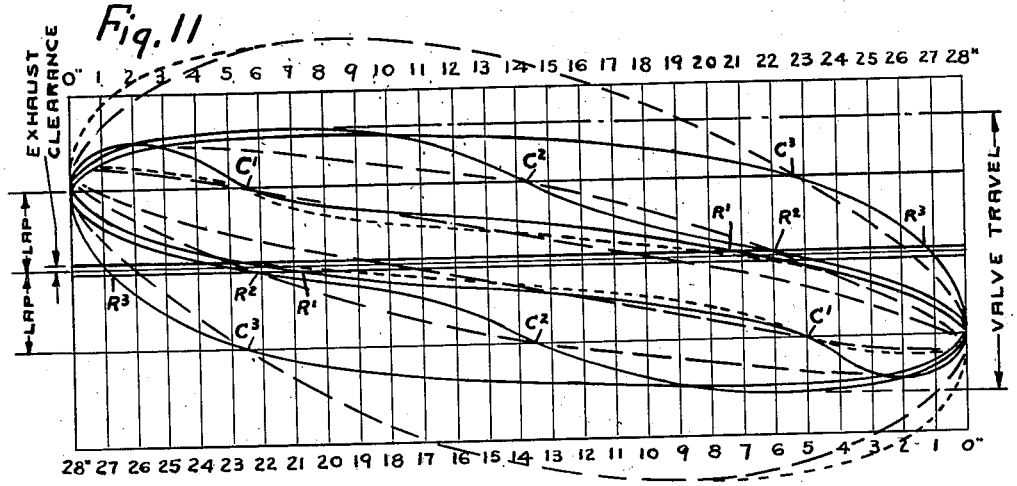
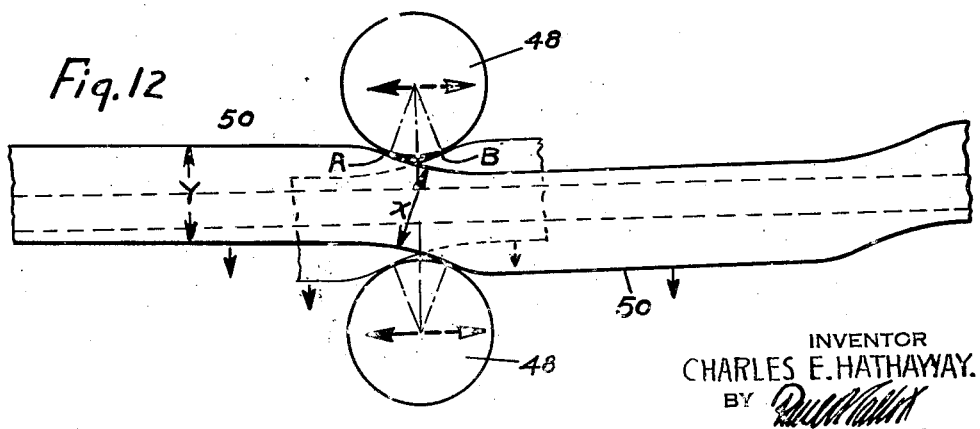
INVENTOR
CHARLES E. HATHAWAY.
BY
PAUL A. TALBOT.
ATTORNEY Patented Apr. 29, 1941

2,239,713

UNITED STATES PATENT OFFICE 2,239,713

VALVE GEAR

Charles E. Hathaway, New York, N. Y.

Application June 27, 1936, Serial No. 87,683

20 Claims. (Cl. 121—165)

My invention relates to a new valve gear particularly adapted to the operation of the valves of locomotives to increase their efficiency and decrease their cost of maintenance and has among its objects to provide:

A means for operating the steam valves of locomotives to more effectively open and close the ports of the engine at the time of admission, cutoff and release under the conditions required.

A valve movement having substantially a constant travel at any cutoff.

A valve gear the working parts of which are enclosed and completely oiled and protected from foreign matter.

A locomotive valve gear with no external cranks, eccentrics and connections to the engine's crossheads.

A self contained locomotive valve motion which may be quickly and easily attached to or removed from the locomotive.

A valve having a minimum reciprocatory movement and therefore minimum stresses in the valve gear due to inertia of the valve.

I accomplish these and other objects by the construction herein described and shown in the accompanying drawings in which:

Figure 1 is a longitudinal section of the gear case.

Figure 2 is a detail view of the reverse lever.

Figure 3 is a detail of the reverse valve.

Figure 4 is a fragmentary horizontal section of the drive connection.

Figure 5 is a fragmentary elevation and partial section of the drive connection.

Figure 6 is a detail view of the reverse crank and immediate parts effecting its operation.

Figure 7 is a vertical section on the line 7—7 Figure 1.

Figures 8 and 9 are detail views of the cam and cam rod.

Figure 10 is diagrammatic view showing the application of my device to the locomotive.

Figure 11 is a graph ellipse of the valve events obtained by my valve gear.

Figure 12 is a fragmentary view showing the cam surfaces as they relate to the cam rollers.

Similar reference characters refer to similar parts throughout the several views of the accompanying drawings and in the following specifications of which they form a part.

In the event which are important in effecting greater economy and performance in the use of steam the admission and control of the steam in operating the piston by most locomotive valve gears is far from what is desirable in that the port opening is in most cases too little at early cutoff and the release is too early.

At short cutoff in the conventional valve movement the travel of the valve is short and at long cutoff the travel of the valve is lengthened. The surfaces of the valve bushing not wiped by the valve at short cutoff become dry and unlubricated. When the cutoff is suddenly lengthened the valve travels over these unlubricated surfaces with the result that the wear and friction are momentarily excessive.

With a relatively fixed length of valve travel at all cutoffs which is characteristic of my valve gear this difficulty is eliminated. Typical also of the ordinary valve gear is the relative slowness of motion of the valve at the point of cutoff and the resultant loss by "wire drawing" of the steam at this point of the travel of the valve. The rapid travel of my valve at the point of cutoff greatly reduces wire drawing.

The acceleration of motion of the movement of the valve at and near the end of its travel partly overcomes the "short comings" of the typical locomotive valve gear and in my patent for Valve gear, Patent Number 2,125,160, of July 26, 1938, I have described my invention for accelerating the motion of the valve at the period when the most critical events occur. My application, Serial Number 376,388, filed January 28, 1941, for Valve gear, discloses and claims improvements on the mechanism of the present invention and also covers methods of operating valves and steam engines applicable to mechanism disclosed herein and specific combinations of a crank movement and cam movement, together with their attendant mechanism, which are disclosed according to one species but not specifically claimed herein.

Referring to Figure 11 of the drawings "The valve ellipse" the graph of the travel and events of the valve may be readily seen. The three lines of the ellipse shown in full lines portray the conditions of valve movement at three positions of cutoff designated by C1 (5½" of the 28" stroke) C2 (14½" of the 28" stroke) and C3 (22½" of the 28" stroke). It will be seen that at these three positions as determined by the position of the reverse lever that the valve travel is substantially the same and also that the points of release R1, R2 and R3 of the three lines of the ellipse are relatively late as compared with the three similar lines of the ellipse of the conventional valve gear shown by the broken lines. A comparison by referring to the dotted lines may also be made of the events of a valve gear having accelerated motion near the ends of stroke but having variable travel as characterized by my invention hereinbefore mentioned.

The dotted line (my accelerated motion Patent Number 2,125,160) before closing the valve at cutoff at C' while having a greater port opening during the period of admission, as represented by the distance from the horizontal line between the end of the diagram Figure 11 and the point C' as compared with the broken line (the conventional valve gear) is, as will be seen, much less than my cam valve gear (full line) herein described.

The relatively large port opening as well as relatively rapid closure of the valve at C1 and C2 are readily seen by a comparison of the ellipses. At other cutoffs between C1 and C2 (not shown) these important advantages are likewise characteristic. It will also be seen that too much preadmission and early closing as well as early release are not characteristics of my valve motion at early cutoffs.

The early release of the three types of valve gear shown by the lines (dotted for my accelerated motion Patent No. 2,125,160, broken for the conventional valve gear and full lines for the cam valve gear herein described) where they cross the horizontal line at R'. It is noted that the broken line crosses at about vertical intersection seventeen, the dotted line crosses at vertical intersection 20 and the full line (R') crosses at vertical intersection twenty and one half. The vertical intersection lines may represent inches of travel of the piston of the engine indicating that the release of my cam valve gear herein described releases about three and one half inches later than the conventional valve gear.

The valve ellipse it is believed is so commonly known that, for the sake of brevity it need not be further explained.

By referring to Figure 10 of the drawings some general comparisons may serve to simplify the more detailed description of the parts of my invention and to make its application to a locomotive more easily understood.

Unlike the conventional locomotive valve gear it will be noted that no direct movement is imparted by the crosshead 1 to the valve 2 and such movement as effects the valve 2 is accomplished entirely by a connection 3 to and in axial alignment with the main axle which may be made by an arm 4 attached to the main pin 5 or in some cases may be taken directly from the main axle inside the frame and bearings of the locomotive. The connection 3 merely transmits rotary motion through the shaft 6 to the gear case 7 secured and supported by the engine frame 8.

The reverse lever 9, reverse valve 10 operated by it and the pipes 11 and 12 with their T's 13 and 14 connecting the reverse cylinder 15 and a similar cylinder on the opposite side of the locomotive are mentioned in connection with the assembly shown in Figure 10 so that later reference will be understood. Likewise the reverse lever 9 and reach rod 16 moved by it as well as the valve stem 17, valve crosshead 18 and the other usual parts of the typical locomotive may be understood. The crosshead 1 imparts power from the piston 19, piston rod 20 and main rod 21 in the usual manner. The cylinders 22 valve chest 23 and the ports and other parts of the engine and locomotive are of the usual construction and operation and thus will not be here described.

The use of a power reverse cylinder operated by the reach rod 16 is not necessary as the load on it and parts operated by the reverse lever are too light to require more than manual strength.

It is believed that the general location, arrangement and the operation of the parts as they are assembled on the locomotive and as above described are sufficiently understood to correlate these parts to the following detailed description. The enclosed moving parts within the gear case 7 and connection 3 and parts inclosed within the housing 24 of said connection 3 are as follows:

By referring to Figures 4 and 5 it will be seen that the main pin 5 is secured to the arm 4 having a tapered pin 25 secured to or forming a part of said arm. The pin 25 is in axial alignment with the main axle (not shown) to which the drivers and main pin 5 are secured in the usual manner.

Detachably secured to the pin 25 is secured the bevel gear 26 the hub 27 of which is extended to receive the inner bearing 28 of the housing 24. Outwardly projecting and forming a part of said bevel gear 26 is the hub or sleeve 29 on which is carried the bearing 30. The housing 24 is provided with a cap or cover 31 which when removed permits the removal of the nut 32 and the bevel gear as well as the housing and the parts assembled within it. The arm 4 is preferably provided with a counter balance 33. To remove the torsion or radial torque from the shaft 6 I have provided the torsion arm 34 and link 35 which is secured to the frame 8 or gear case 7.

The bevel pinion 37 secured to the shaft 6 as well as the gear 26 and bearings 28 and 30 are bathed in oil or grease and dirt is prevented from entering the running parts of the connection 3 by said housing 24 and the packing 38 which makes the housing air tight. The bearings 36 at the lower end of said shaft 6 are preferably mounted in the sleeve 39 permitting their assembly and adjustment in the shop at the same time as the other bearings within the housing 24. The stuffing box 40 may be removed thus making the nut 40' accessible for the removal of the parts.

A flexible coupling 41 is preferably detachably secured to the shaft 6 near its lower end to facilitate all of the assembled parts of the connection 3 to be easily removed and to permit the angular misalignment caused by the movement of the main axle in relation to the frame 8 of the locomotive.

The shaft 6 is preferably provided with a spline or slip joint 42 and an upper flexible joint 43 near the gear case 7 into which said shaft 6 enters through the oil tight stuffing box 44 detachably secured to said gear case at an angle due to the inclination of said shaft 6 which connects the revolving pin 25 to the gear case 7 which is arranged forwardly and above it.

Within the gear case 7 on said shaft 6 is mounted the angular pinion 45 which engages and revolves the cam roller spider 46 by means of the angular gear 47 secured to said spider.

The cam rollers 48 rotatably secured within said spider and forced by said spider to revolve about the cam rod 49 act upon the cam and surfaces 50 at the rim of said cam to force it to reciprocate the cam rod 49 which is slidably as well as rotatably mounted in the bearings 51 and 52 of said spider 46 which also is held from axial movement by the thrust bearings 53 and 54 secured to and within said housing 7.

The cam rod 49 projects rearwardly terminating into a splined end 55 slidably engaging the splined segmental spiral gear 56 which oscillates in the bearings 57 and 58 both secured to and within the gear case 7. The bearing 57 is preferably secured to the bearing 53 by the rearwardly extended cylinder 59 which is provided with the shoulders 60 and 61 which prevent axial movement of the segmental spiral gear 56 in one direction. The thrust and axial movement in the opposite direction is arrested by the shoulder 62 of the bearing 58. The shoulder 61 takes the thrust of the thrust bearing 53 and prevents movement of the cam roller spider 46 rearwardly.

The keeper 63 secured to the thrust bearing 54 takes the forward thrust of the cam roller spider 46 in the forward direction.

The segmental spiral gear 56 engages the slidably mounted spiral rack or pinion 64 which is forced to move axially by the link 65 connected at one end to the shaft 66. The shaft 66 is provided with thrust bearings 67 and 68 and the guides 69 and 70 slidably mounted in the cylinder 71. The rearward end of the link 65 engages and is moved by the lever 72 mounted on the lateral shaft 73 which passes under the locomotive boiler 74 to the opposite side of the locomotive whereon is mounted the similar lever 72 moving the duplicate parts of the left hand gear case 7 in every respect similar to the one shown and herein described.

The levers 72 are moved by the reverse lever 9 and reach rod 16 in the usual manner.

Mounted in the guide cylinder 71 and arranged diametrically opposite the segmental spiral gear 56 in relation to the spiral pinion 64 I have provided a stationary spline or key 75 which engages in a groove or keyway 75' in said spiral pinion 64 and causes it to revolve the segmental gear 56 upon any axial movement of said pinion thereby adjusting said segmental spiral gear and also the cam.

Thus it may be seen that any movement of the reverse lever 9 through the various parts above described oscillates said cam 50 and as said cam is so mounted as to move axially by the rotatably mounted rollers 48 the axial movement of the cam rod 49 on which said cam is mounted will by said oscillatory movement be retarded or advanced in its axial movement in relation to the revolving of said rollers and the parts directly moving the roller such as the shaft 6 which is directly driven by the main axle and the piston 19 thus changing the cutoff by the valve.

It may be desirable for the sake of brevity to term the axial movement of the cam rod as M1, and the movement of the parts, the description of which follows, as M2.

The shaft 6 in addition to driving the angular pinion 45 effecting M1 also drives the bevel pinion 76 which engages the bevel gear 77 mounted on the transverse shaft 78 on which also is secured the spiral pinion 79 which engages the double spiral gear 80 rotatably mounted on the vertical floating shaft 81. The spiral gear 80 meshes with and drives the spiral gear 82 secured to the crank shaft 83 which is preferably transversely journaled in the gear case 7 parallel to the transverse shaft 78 and mounted in the removable bearings 84 and 85.

The floating shaft 81 is moved axially and vertically by the piston 81' within the reverse cylinder 15 the piston being connected to and operated by the movement of the reverse lever 9. The movement of the reverse lever and the consequent movement of the spiral gear 80 change the relationship of the crank shaft 83 and transverse shaft 78. Thus if the shaft 78 were held stationary and the pinion 80 moved vertically such vertical movement would revolve the crank shaft a part of a revolution depending on the vertical travel of the spiral gear 80. The same change of relationship between the shafts 73 and 83 exists whether they are at rest or in motion. The crank 86 of said crank shaft 83 is connected to the end of beam 87 by means of a connecting rod 88. Between the ends of said beam 87 the cam rod 49 is connected by means of the swivel joint 89 and supporting bell crank 90 which functions in the dual capacity of a crosshead and torsion lever as well as supporting the beam 87 and thus uniting and combining the M1 and M2 movements in the movement of the end 91 of said beam which moves the valve 2 by being connected directly to it through its valve stem 17 and valve crosshead 18 or through the reversal of the movement by means of the walking beam 92 swingingly attached to the gear case 7 or frame 8 by a bracket 93. The link 94 connecting the end 91 to the beam 92 the lower end of which is connected by the link 95 to the valve crosshead 18 thereby connecting the end 91 indirectly to the valve 2. By the use of the walking beam the M1 and M2 travel may be reversed or by reason of the location of bracket 93 the travel may be increased or decreased as desired. The link 94 preferably passes through the front end of the gear case and through the floating packing 94' which prevents leakage of oil and the admission of dust, moisture and other foreign matter into the gear case.

Referring to Figure 12 of the drawings (a fragmentary plan view) the relationship between the cam rollers 48 to the cam and its surfaces 50 may be better understood.

The upper pair of rollers when moving in the direction of the arrows shown in full lines force the cam 50 to travel in the direction shown by the arrows extending from the cam surface toward the bottom of the sheet of drawings by advancing on the inclined surface A at the top and on the inclosed surface B diametrically opposite (a short fragment of the surface only being shown). Looking downward the direction of travel of the lower pair of rollers which of course travel in the opposite direction relatively is shown by the dotted arrows. The side strains on the cam rod as it slides in its bearings due to the rollers forcing the cam and cam rod to reciprocate are thus neutralized.

The otherwise parallel cam surfaces at the period of "no motion" axially of the cam rod are necessarily changed from parallel as the cam is moved. The distance between the rollers is the same as they are held in fixed relationship therefore as the point of contact on the inclined surfaces of the cam becomes an angle in relation to the travel of the cam the distance X is less than the distance Y which thus causes each of the opposed pair of rollers to be held at all times in contact with the two cam faces or surfaces.

The number, shape and travel of the inclined surfaces may vary depending on the relative revolutions the spider 46 and the cam rollers 48 carried by it to the revolutions of the main axle. In the drawings the shaft 6 travels at twice the speed of the main axle and the spider at one half of the speed of the main axle therefore twice the number of inclined surfaces. Likewise the crank 86 must make one revolution to each revolution of the main axle.

The gear case is preferably made with a removable upper half and is oil tight preventing foreign matter from entering the running parts and also preventing oil from escaping, as the case is partially filled with oil to increase the life and decrease the friction of my valve gear.

The reverse lever 9 may be connected to the reverse valve 10 by means of the rod 96 and lever 97 to operate the plug 98 which may be oscillated in the housing 99 to connect the pressure inlet 100 to the pipe 11 thereby forcing the piston 81' downwardly in the cylinder 15. The exhaust pipe 101 simultaneously is connected with the pipe 12 releasing pressure from the under side of the piston 81'.

A movement of approximately 90 degrees of the lever 97 as shown by broken lines in Figure 3 connects the pressure inlet 100 to the pipe 12 and the exhaust pipe to the pipe 11 thus forcing the piston 81' upwardly and changing the relative position of the crank shaft 83 to the laterial shaft 78 and the parts driving it from the main axle.

The movement of the lever 97 may be made only at the ends of travel of the reverse lever 9 by means of slack motion provided in the slot 102 in the rod 96 or may be instantly thrown from one extreme of travel to the opposite as soon as the reverse lever passes the central position as may be desired.

The gear case 7 is preferably removably secured to the locomotive frame 8 by the bolts 103 which when removed together with the links 65 and 94 or the valve crosshead 18 and the flexible coupling 43 the entire gear case may be quickly replaced by a duplicate unit.

The main axle, crank shaft or drive shaft in axial alignment with the tapered pin 25 may have the gear 26 secured to the shaft. The tapered pin and arm for most locomotives is desirable to facilitate accessibility by having all of the moving parts on the outside of the frame.

The vertical floating shaft 81 is preferably provided with the sleeve 104 adjustably held between the nuts 105 and 106. The spiral gear 80 is rotatably mounted on said sleeve between the shoulder and collar 107 and retainer head 108 which also serves as a guide for the lower end of said shaft 81 and the parts mounted on it. The head 108 is vertical movable in the guide 109 preferably detachable, secured to the bottom of the gear case 7 and of sufficient diameter to permit the removal of the spiral gear 80. The shoulder or collar 107 and head 106 also serve to limit the vertical travel of the gear 80 in reversing the crank 86.

The variation of cutoff is provided in the usual manner by the reverse lever which shortens the cutoff as the reverse lever approaches the central position of the quadrant which moves the cam 50 as hereinbefore described.

The movement of the crank 83 need not be moved to effect the cutoff and may be moved its entire distance of travel for reversing the engine.

While I have described in detail the parts of one of the various forms of construction my invention may permit, it is obvious that the construction may be modified in numerous ways to suits its application to service and design of the locomotive or other engine to which it may be applied. I do not wish therefore to be limited to the construction herein described and shown as I may wish to depart therefrom within the scope of the appended claims which succinctly set forth my invention.

I claim:

1. In a valve gear for engines, the combination with a valve, of cam means for imparting motion to the valve, said means including a cam and contactor, means for varying the relative position of the cam and contactor to vary the cut-off of the valve, and means independent of the cam means for imparting motion to the valve, said independent means being adjustable to reverse the direction of travel of the engine.

2. In a valve gear for engines, the combination with a valve, of cam means for imparting motion to the valve, said means including a cam and contactor, means for varying the relative positions of the cam and contactor to vary the cut-off of the valve, means independent of the cam means for imparting motion to the valve, and means for varying the action of said independent means to reverse the direction of travel of the engine.

3. In a valve gear for engines, the combination with a valve, of cam means for imparting motion to the valve, said means including a cam and contactor, means for varying the relative positions of the cam and contactor to vary the cut-off of the valve, means independent of the cam means for imparting motion to the valve and adjustable to reverse the direction of travel of the engine, and a common drive means for the cam means and the independent means.

4. In a valve gear for engines, the combination of a valve, revolvable cam means including a cam and contactor for imparting reciprocating movement to the valve, means independent of the cam means for imparting movement to the valve, and a shaft revolved by the engine and driving both said cam means and said independent means.

5. In a valve gear for engines, the combination of a valve having a stem, a combining lever connected to the stem and operable to reciprocate the valve, revolvable cam means connected to the lever for imparting movement thereto, means independent of the cam means for imparting movement to the lever, and a common rotary means driven from a moving part of the engine operating said cam means and said independent means.

6. In a valve gear for engines, the combination of a valve, cam means for imparting reciprocating movement to the valve, means for adjusting the cam means to vary the cut-off, means independent of the cam means for imparting reciprocating movement to the valve, means for adjusting the independent means to reverse the direction of operation of the engine, and a common drive means actuated by a moving part of the engine operating both the cam means and the independent means.

7. In a locomotive engine valve gear, the combination of a valve, revolvable cam means for imparting reciprocating movement to the valve, means independent of the cam means for imparting reciprocating movement to the valve, an axle, and means revolved from the axle operating both the cam means and the independent means.

8. In a valve gear for engines, the combination of a valve, cam means for imparting reciprocating movement to the valve, said means including a cam and contactor means, means for varying the relative angular position of the cam and contactor means to vary the cut-off, means independent of the cam means for imparting reciprocating movement to the valve, means for varying the operation of the independent means to reverse the direction of operation of the engine, and a common drive means actuated by the engine for operating the cam means and the independent means.

9. In a locomotive valve gear, an oil tight gear case, an engine valve and a valve gear comprising cam means and means independent of said cam means for operating said engine valve, a shaft passing through said gear case imparting motion to both said cam means and said independent means.

10. In a locomotive valve gear, an oil tight gear case, an engine valve and a valve gear comprising cam means and means independent of said cam means for operating said engine valve, a shaft passing through said gear case imparting motion to both said cam means and said independent means, and means forming a part of said oil tight gear case to prevent oil leakage around said shaft, a link, moving longitudinally and laterally connecting said gear case and means in said gear case for preventing oil leakage around said link.

11. In a locomotive valve gear, an oil tight gear case, an engine valve and a valve gear comprising cam means and means independent of said cam means operating said engine valve from said cam means and independent means within said gear case, and a locomotive frame detachably secured to each end of said housing thereby detachably securing said gear case to the locomotive frame.

12. In a valve gear, an engine valve, a cam having opposed cam surfaces of varying distances apart and axially movable to reciprocate the engine valve and rotary means operated by the engine to impart motion to the cam and means coacting with said cam to vary the cutoff.

13. In a valve gear, an engine valve, a cam operated by the engine and axially movable to impart reciprocating motion to the engine valve and means rotating said cam to vary the relation of reciprocation of said valve to the engine movement to vary the cut off.

14. In a valve gear, an engine valve, a cam operated by the engine and axially movable to impart reciprocating motion to the engine valve and rotatable to vary the cut off, cam rollers revolvable about said cam to impart reciprocating motion thereto and means operated by the engine shaft for revolving said cam rollers.

15. In a valve gear, an engine valve, a cam operated by the engine and axially movable to impart motion to the engine valve and rotatable to vary the cut off and means co-acting with said cam and independent of its motion for moving said engine valve and means operating said independent means to reverse the direction of travel of the engine.

16. In a valve gear, an engine valve, a cam operated by the engine and axially reciprocating to impart motion to the engine valve and rotatable to vary the cut off and means co-acting with said cam and independent of its motion for moving said engine valve, means co-acting with said cam and independent motion for moving said engine valve and means imparting the motion of said cam and said means independent thereof to move the engine valve and means operating said independent means to reverse the direction of travel of the engine.

17. In a valve gear, an engine valve, a cam operated by the engine movable to impart reciprocating movement to the engine valve and revolvable to vary the cut off and independent means co-acting with said cam to reverse the direction of travel of the engine, said independent means co-acting with said cam for moving said engine valve and an oil tight gear case detachably secured to the engine supporting and housing said valve gear and bearings therein permitting rotary movement of said cam and reciprocating movement for reciprocating said engine valve.

18. In a valve gear, an engine valve, a cam having double faces and operated by the engine, a cam rod fixedly secured to said cam and reciprocated thereby, pairs of cam rollers, one of each pair of said rollers held in contact with one of the faces of said cam and the other of said rollers held in contact with the other face of said cam to impart motion to said engine valve, a reverse lever and means operated thereby to effect rotary movement of said cam whereby the cut off may be varied by the movement of said reverse lever.

19. In a valve gear for engines, the combination with a valve of a crank means for imparting sinusoidal motion, additional means for imparting a reciprocatory motion of constant length, means for combining the motions of said first two means for actuating said valve through a constant valve travel, and means for adjusting the phase relation of said first two means while maintaining constant valve travel to secure a variable cut-off.

20. A valve gear according to claim 19, comprising also means for adjusting said crank means to reverse the direction of travel of the engine.

CHARLES E. HATHAWAY.